United States Patent
Hai

(10) Patent No.: US 10,295,860 B2
(45) Date of Patent: May 21, 2019

(54) PRIVATE DISPLAY DEVICE, DECRYPTED VIEWING DEVICE AND DISPLAY SYSTEM

(71) Applicant: Shenzhen China Star Optoelectronics Technology Co., Ltd., Shenzhen, Guangdong (CN)

(72) Inventor: Bo Hai, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 100 days.

(21) Appl. No.: 15/310,705

(22) PCT Filed: Sep. 12, 2016

(86) PCT No.: PCT/CN2016/098679
§ 371 (c)(1),
(2) Date: Nov. 11, 2016

(87) PCT Pub. No.: WO2018/018713
PCT Pub. Date: Jan. 2, 2018

(65) Prior Publication Data
US 2018/0180938 A1    Jun. 28, 2018

(30) Foreign Application Priority Data

Jul. 28, 2016    (CN) .......................... 2016 1 0600263

(51) Int. Cl.
*G02F 1/1333*    (2006.01)
*G02F 1/1335*    (2006.01)
(Continued)

(52) U.S. Cl.
CPC ..... *G02F 1/133528* (2013.01); *G02B 5/3033* (2013.01); *G02B 27/286* (2013.01);
(Continued)

(58) Field of Classification Search
CPC ................. G02F 1/1335; G02F 1/1333; G02F 1/133528; G02F 1/13363; G02F 2413/08;
(Continued)

(56) References Cited

U.S. PATENT DOCUMENTS 6,392,727 B1 * 5/2002 Larson .............. G02F 1/133502
349/117
2017/0038638 A1 * 2/2017 Park ...................... G02F 1/1335

FOREIGN PATENT DOCUMENTS

CN        101097316 A    1/2008
CN        101097343 A    1/2008
(Continued)

*Primary Examiner* — Charles S Chang
(74) *Attorney, Agent, or Firm* — Andrew C. Cheng

(57) ABSTRACT

The present disclosure discloses a private display device, which comprises: a color film substrate and an array substrate provided to a box; a liquid crystal provided between the color film substrate and the array substrate; a first polarizing film provided on surface of the color film substrate facing away from the array substrate; a first quarter wave plate provided on the surface of the array substrate facing away from the color film substrate; wherein the direction of the absorption axis of the first polarizing film is different from the direction of the optical axis of the first quarter wave plate. The present disclosure also discloses a decrypted viewing device and a display system.

11 Claims, 4 Drawing Sheets

(51) Int. Cl.
*G02F 1/13363* (2006.01)
*G02B 27/28* (2006.01)
*G02B 5/30* (2006.01)

(52) U.S. Cl.
CPC ............... *G02F 1/13363* (2013.01); *G02F 2001/133531* (2013.01); *G02F 2001/133638* (2013.01); *G02F 2413/01* (2013.01); *G02F 2413/05* (2013.01); *G02F 2413/08* (2013.01)

(58) Field of Classification Search
CPC ..... G02F 2001/133638; G02F 2413/01; G02F 2413/05; G02F 2001/133531; H01L 51/52; G02B 27/286; G02B 5/3033
See application file for complete search history.

(56) References Cited

FOREIGN PATENT DOCUMENTS

| | | |
|---|---|---|
| CN | 102360136 A | 2/2012 |
| CN | 103018955 A | 4/2013 |
| CN | 103064211 A | 4/2013 |
| CN | 202995194 U | 6/2013 |
| CN | 104375278 A | 2/2015 |
| CN | 104730758 A | 6/2015 |
| JP | H05173126 A | 7/1993 |

\* cited by examiner

PRIVATE DISPLAY DEVICE, DECRYPTED
VIEWING DEVICE AND DISPLAY SYSTEM

BACKGROUND OF THE DISCLOSURE

1. Field of the Disclosure

The present disclosure relates to a display technical field, and in particular to a private display device, a decrypted viewing device and a display system.

2. The Related Arts

Along with the wide application of liquid crystal displays, a variety of display devices continue to emerge, such as mobile phone, tablet, TV, etc. have been widely used in daily life, but in public places, when used in the occasions that need to protect privacy such as withdrawing in ATM machines or other circumstances, the information on the display is easily visible to others, thereby revealing the privacy.

The current common LCD panel display mode mainly comprises twisted nematic, TN, mode, vertical alignment, VA, mode, and in-plane switching, IPS, mode. VA mode and IPS mode are normally black mode, TN mode is normally white mode, in the three modes, the absorption axes of the polarizers of the upper and lower substrates are vertically offset. The principle of the liquid crystal display in the V A mode and the IPS mode is based on the characteristic that the light transmittance of the liquid crystal varies with the magnitude of the voltage applied thereto. After the light passes through the polarizing film of the substrate, which becomes linearly polarized light, the direction of polarization is the same as the direction of penetration of the lower polarizing film. When no voltage is applied, the direction of polarization does not change when the light passes through the liquid crystal. The polarizing film light passing through the upper substrate (color film substrate) is absorbed, which is dark state.

When the voltage is applied, the liquid crystal is deflected in the direction of alignment under the action of electric field. When light passes through the liquid crystal layer, the linearly polarized light is decomposed into two beams due to the refraction of the liquid crystal. Moreover, since the light propagation speed of these two beams is different, when the two beams are combined, the polarization direction of the polarized light must be changed. As the voltage increases, the degree of deflection of the liquid crystal is also increased, the change to the polarization direction of linearly polarized light is also increased, and the polarization direction is closer to the penetrating direction of the upper polarizing film. Thereby achieving the different gray-scale changes. Therefore, the polarization of the lower polarizer and the polarization of the upper polarizer are indispensable.

At present, most common private display devices are the simple removal of the polarizing films, so that the display image does not display properly. And then using an external polarizing film or a sunglass to view the image. This has two problems: 1. The protection of privacy is poor, this is because polarizing films and sunglasses (including polarizing films) are more common, others are easy to find to view the displayed image, thus losing the purpose of protecting privacy. 2. The display effect during rotating the external polarizing films or sunglasses is poor, even can not watch, this is because only when the angle between the absorption axes of the upper and lower polarizing films is 90 degrees, the dark state is the darkest, the contrast is highest, the display effect is best; when the external upper polarizing films or sunglasses are rotated, the dark state brightens, the contrast is lowered, and the display effect is deteriorated, especially when the upper and lower polarizing films are parallel, the image can not be viewed basically.

SUMMARY OF THE DISCLOSURE

In order to solve the above technical issues, the present disclosure provides private display device, a decrypted viewing device and a display system.

According to one aspect, providing a private display device, which comprises: a color film substrate and an array substrate provided to a box; a liquid crystal provided between the color film substrate and the array substrate; a first polarizing film provided on surface of the color film substrate facing away from the array substrate; a first quarter wave plate provided on the surface of the array substrate facing away from the color film substrate; wherein the direction of the absorption axis of the first polarizing film is different from the direction of the optical axis of the first quarter wave plate.

Furthermore, the private display device also comprises: a protective film provided on the surface of the first quarter wave plate facing away from the color film substrate.

Furthermore, an angle between the direction of the optical axis of the first quarter wave plate and the direction of the absorption axis of the first polarizing film is 45° or 135°.

Furthermore, the direction of the absorption axis of the first polarizing film is 0° or 90°, the direction of the optical axis of the first quarter wave plate is 45° or 135°.

According to another aspect, providing a decrypted viewing device, which is used to view the private display device described above, the decrypted viewing device comprises: a second polarizing film and a second quarter wave plate provided opposite to each other, the direction of the absorption axis of the second polarizing film is the same as the direction of the absorption axis of the first polarizing film, the direction of the optical axis of the second quarter wave plate is the same as the direction of the optical axis of the first quarter wave plate; wherein when the decrypted viewing device views the private display device, the second quarter wave plate faces the private display device.

According to the other aspect, providing a display system, comprising a private display device and a decrypted viewing device relatively provided; the private display device comprises: a color film substrate and an array substrate provided to a box; a liquid crystal provided between the color film substrate and the array substrate; a first polarizing film provided on surface of the color film substrate facing away from the array substrate; a first quarter wave plate provided on the surface of the array substrate facing away from the color film substrate; wherein the direction of the absorption axis of the first polarizing film is different from the direction of the optical axis of the first quarter wave plate; said decrypted viewing device comprises: a second quarter wave plate facing the first quarter wave plate, the direction of the optical axis of the second quarter wave plate is the same as the direction of the optical axis of the first quarter wave plate; a second polarizing film provided on the surface of the first quarter wave plate facing away from the second quarter wave plate, the direction of the absorption axis of the second polarizing film is the same as the direction of the absorption axis of the first polarizing film.

The benefit effect of the present disclosure is: the display image can not be seen when the private display device of the present disclosure is normally viewed, the image can be seen only when the private display device of the present disclosure is viewed using the decrypted viewing device of the present disclosure, thereby effectively protecting the privacy, at the same time, the upper polarizing film of the display panel can be omitted, simplifying the process and reducing costs.

BRIEF DESCRIPTION OF THE DRAWINGS

Through combining the following drawings to describe the embodiments, the above and other purpose and advantages of the present disclosure will be more clearly, wherein.

DETAILED DESCRIPTION OF THE PREFERRED EMBODIMENTS

Figure 1:
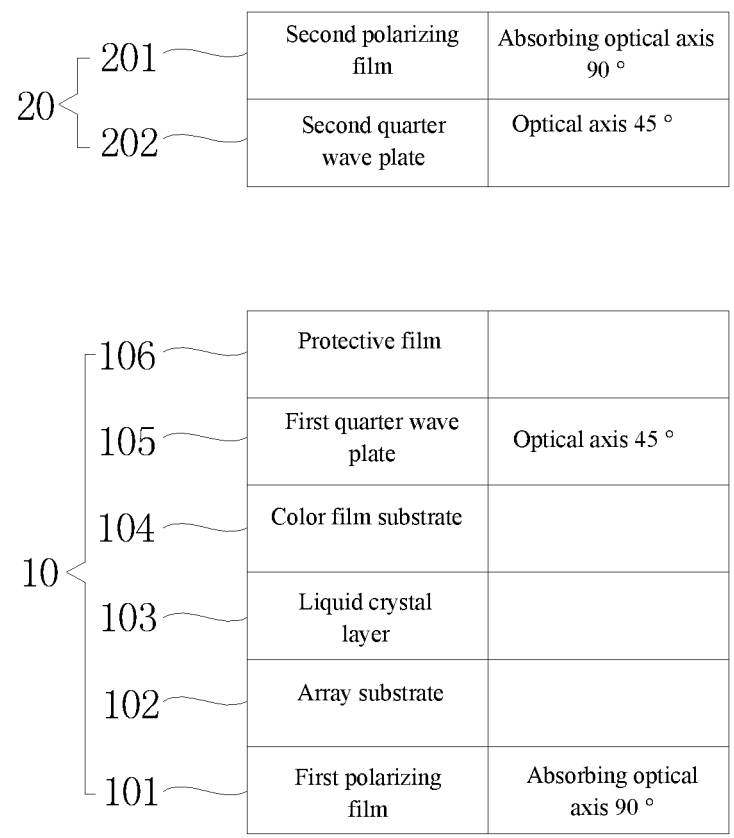
FIG. 1 is a structure schematic diagram of a display system according to the embodiment of the present disclosure.

The following will describe the embodiments of the present disclosure in detail referring to the drawings. However, the present disclosure may be embodied in many different forms and should not be construed as limited to the embodiments set forth herein. Instead, these embodiments are provided so that this disclosure will be thorough and complete, and the scope of the present disclosure is fully conveyed to those skilled in the art.

In the drawings, for clarity, the shape and dimensions of elements may be exaggerated, and the same reference numerals will be used to denote the same or similar elements.

FIG. 1 is a structure schematic diagram of a display system according to the embodiment of the present disclosure.

Refer to FIG. 1, the display system according to the present disclosure comprises: a private display device 10 and a decrypted viewing device 20 facing each other. In other words, using the decrypted viewing device 20 to view the image or screen displayed by the private display device 10.

Specifically, the private display device sequentially comprises from the bottom to up: a first polarizing film 101, an array substrate 102, a liquid crystal layer 103, a color film substrate 104, a first quarter wave plate 105 and a protective film (or surface treatment film) 106.

Furthermore, the array substrate 102 and the color film substrate 104 are provided to the box, the liquid crystal layer is provided therebetween. Since the array substrate 102 and the color film substrate 104 adopted by the present embodiment are substantially the same as the array substrate and the color film substrate in the prior art, the specific structure of both can be referred to the structure of the prior art.

The first polarizing film 101 is provided on the surface of the color film substrate 104 facing away the array substrate 102, the first quarter wave plate 105 is provided on the surface of the array substrate 102 facing away the color film substrate 104. In the present embodiment, preferably, the angle between the absorption axis of the first polarizing film 101 and the direction of the optical axis of the first quarter wave plate 105 is 45°, but the present disclosure is not limited by this. In the present disclosure, there is only needed that the direction of the absorption axis of the first polarizing film 101 and the direction of the optical axis of the first quarter wave plate 105 is the same.

Furthermore, the direction of the absorption axis of the first polarizing film is 0° or 90°, the direction of the optical axis of the first quarter wave plate is 45° or 135°.

Preferably, the protective film 106 is provided on the surface color film substrate 104 facing away the first quarter wave plate 105. Since the material of the first quarter wave plate 105 is generally made of a material such as COP (cyclic polyolefin) or TAC (triacetyl cellulose), and the thickness of the first quarter wave plate 105 is generally several tens of microns, the first quarter wave plate 105 is easily destroyed by an external environment or a hard object, therefore, providing the protective film 106 on the surface of the color film substrate 104 facing away the first quarter wave plate 105 in order to protect the first quarter wave plate, further improving the hardness and scratch resistance of the first quarter wave plate 105. It should be realized that as another embodiment of the present invention, the protective film 106 may not be provided.

The decrypted viewing device 20 comprises: a second polarizing film 201 and a second quarter wave plate 202 provided to each other. As an embodiment of the present disclosure, the second polarizing film 201 and the second quarter wave plate 202 may be sequentially attached to the outside of the lens of the eyeglass or other transparent carrier in order to form the decrypted viewing device 20. In this way, when using the decrypted viewing device 20 to view the private display device 10, making the second quarter wave plate 202 face the private display device 10.

Furthermore, the direction of the absorption axis of the second polarizing film 201 is the same as the direction of the absorption axis of the first polarizing film 101, the direction of the optical axis of the second quarter wave plate 202 is the same as the direction of the optical axis of the first quarter wave plate 105. Namely, the direction of the absorption axis of the second polarizing film is 90°, the direction of the optical axis of the second quarter wave plate is 45°.

Figure 2:
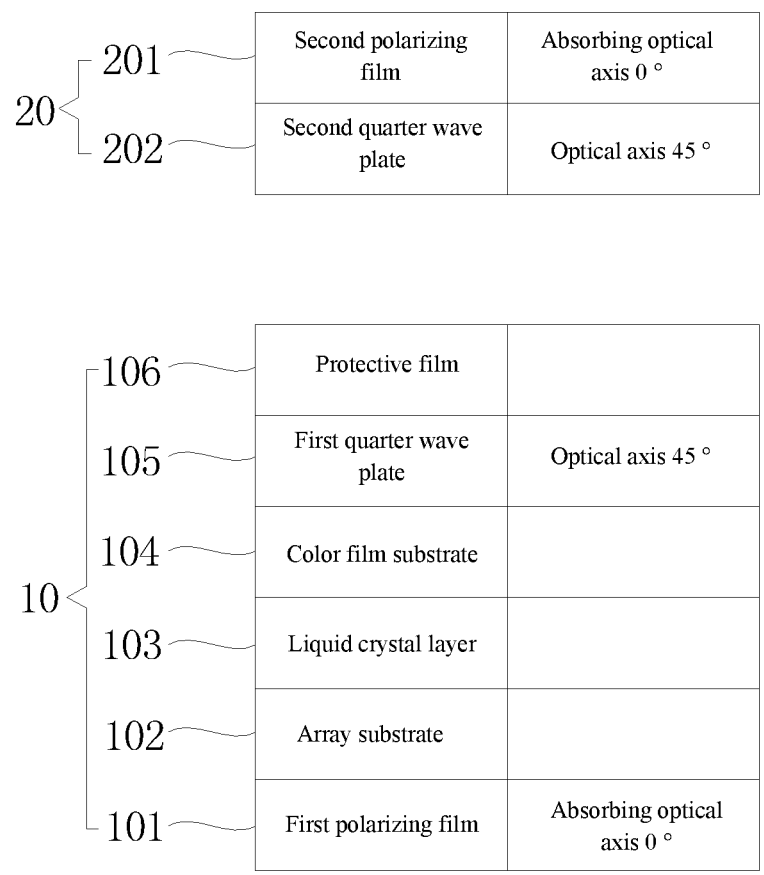
FIG. 2 is a structure schematic diagram of a display system according to another embodiment of the present disclosure.

As another embodiment of the present disclosure, refer to FIG. 2, the direction of the absorption axis of the first polarizing film 101 is 0°, the direction of the optical axis of the first quarter wave plate 105 is 45°; the direction of the absorption axis of the second polarizing film 201 is 0°, the direction of the optical axis of the second quarter wave plate 202 is 45°.

Figure 3:
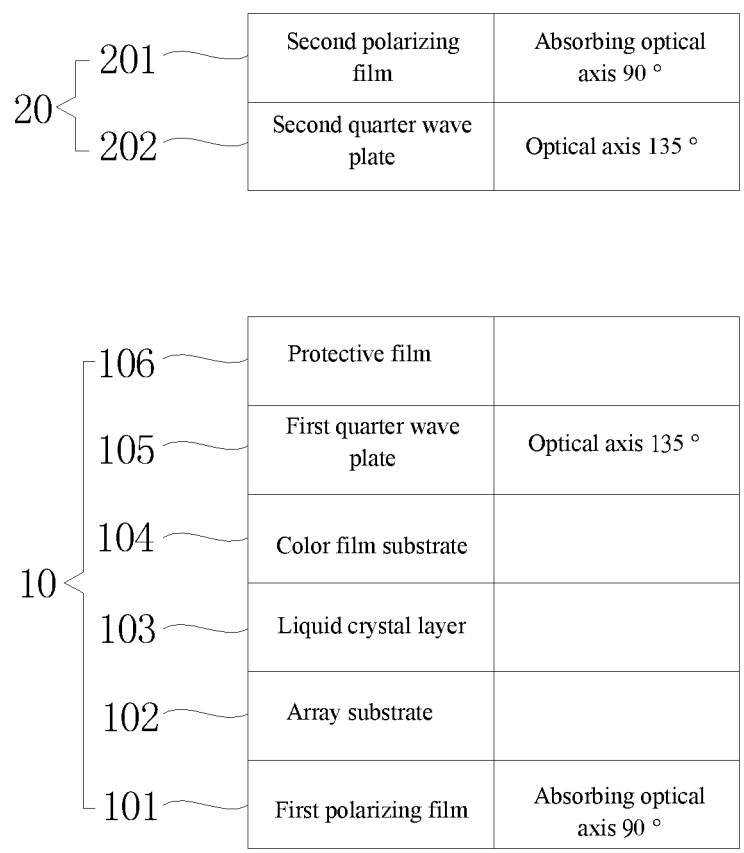
FIG. 3 is a structure schematic diagram of a display system according to the other embodiment of the present disclosure.

As the other embodiment of the present disclosure, refer to FIG. 3, the direction of the absorption axis of the first polarizing film 101 is 90°, the direction of the optical axis of the first quarter wave plate 105 is 135°; the direction of the absorption axis of the second polarizing film 201 is 90°, the direction of the optical axis of the second quarter wave plate 202 is 135°.

Figure 4:
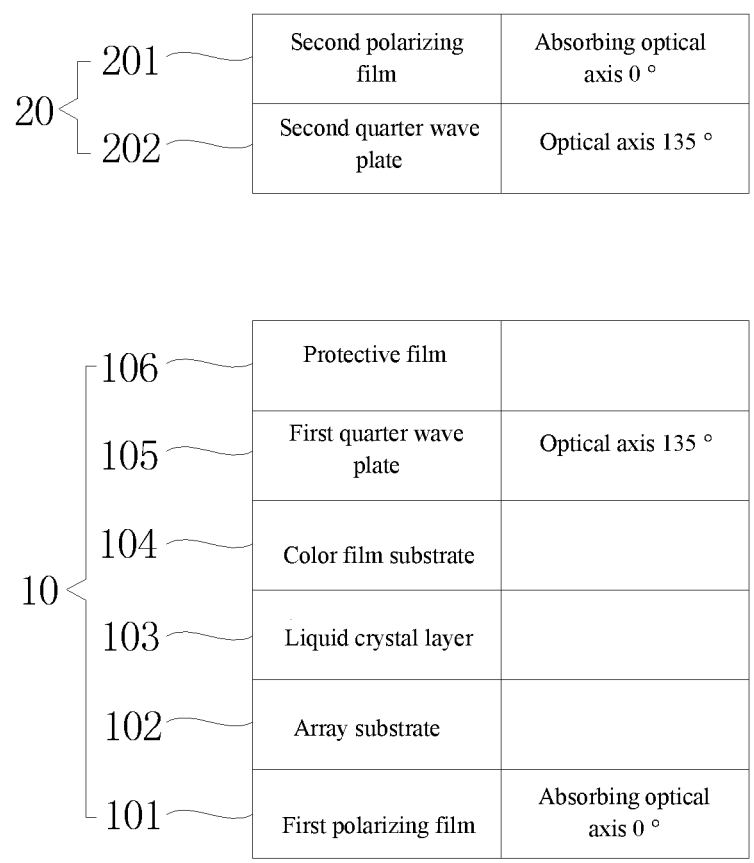
FIG. 4 is a structure schematic diagram of a display system according to the other embodiment of the present disclosure.

As the other embodiment of the present disclosure, refer to FIG. 4, the direction of the absorption axis of the first polarizing film 101 is 0°, the direction of the optical axis of the first quarter wave plate 105 is 135°; the direction of the absorption axis of the second polarizing film 201 is 0°, the direction of the optical axis of the second quarter wave plate 202 is 135°.

In summary, according to the embodiments of the present disclosure, the display image can not be seen when the private display device 10 of the present disclosure is normally viewed, the image can be seen only when the private display device 10 of the present disclosure is viewed using the decrypted viewing device 20 of the present disclosure, thereby effectively protecting the privacy, at the same time, the upper polarizing film of the display panel can be omitted, simplifying the process and reducing costs.

Although the present disclosure has been described in detail referring to the exemplary embodiments of the present disclosure, those skilled in the art will appreciate that the above embodiments may be modified without departing from the scope and spirit of the present disclosure.

What is claimed is:

1. A private display device, comprising:
   a color film substrate and an array substrate provided to form a box;
   a liquid crystal provided between the color film substrate and the array substrate;
   a first polarizing film provided on a surface of the color film substrate facing away from the array substrate;
   a first quarter wave plate provided on a surface of the array substrate facing away from the color film substrate;
   wherein a direction of an absorption axis of the first polarizing film is different from a direction of an optical axis of the first quarter wave plate;
   wherein the first quarter wave plate has a surface that is facing away from the color film substrate and exposed to the outside and a protective film is attached directly to the surface of the quarter wave plate that is exposed to the outside.

2. The private display device as claimed in claim 1, wherein an angle between the direction of the optical axis of the first quarter wave plate and the direction of the absorption axis of the first polarizing film is 45° or 135°.

3. The private display device as claimed in claim 2, wherein the direction of the absorption axis of the first polarizing film is 0° or 90°, and the direction of the optical axis of the first quarter wave plate is 45° or 135°.

4. The private display device as claimed in claim 1, wherein an angle between the direction of the optical axis of the first quarter wave plate and the direction of the absorption axis of the first polarizing film is 45° or 135°.

5. The private display device as claimed in claim 1, wherein the direction of the absorption axis of the first polarizing film is 0° or 90°, and the direction of the optical axis of the first quarter wave plate is 45° or 135°.

6. A decrypted viewing device, which is used to view the private display device as claimed in claim 1 in order to via an image displayed on the private display device, wherein the decrypted viewing device comprises: a second polarizing film and a second quarter wave plate provided opposite to each other, wherein a direction of an absorption axis of the second polarizing film is the same as the direction of the absorption axis of the first polarizing film, and a direction of an optical axis of the second quarter wave plate is the same as the direction of the optical axis of the first quarter wave plate;
   wherein the decrypted viewing device is positionable away from and separate from the private display device for viewing the private display device, such that the second quarter wave plate faces the private display device.

7. A display system, comprising a private display device and a decrypted viewing device relatively provided;
   wherein the private display device comprises:
   a color film substrate and an array substrate provided to form a box;
   a liquid crystal provided between the color film substrate and the array substrate;
   a first polarizing film provided on a surface of the color film substrate facing away from the array substrate;
   a first quarter wave plate provided on a surface of the array substrate facing away from the color film substrate;
   wherein a direction of an absorption axis of the first polarizing film is different from a direction of an optical axis of the first quarter wave plate;
   wherein the first quarter wave plate has a surface that is facing away from the color film substrate and exposed to the outside and a protective film is attached directly to the surface of the quarter wave plate that is exposed to the outside;
   wherein said decrypted viewing device is positionable away from and separate from the private device for viewing the private display device, and the decrypted viewing device comprises:
   a second quarter wave plate facing the first quarter wave plate, wherein a direction of an optical axis of the second quarter wave plate is the same as the direction of the optical axis of the first quarter wave plate; and
   a second polarizing film provided on a surface of the second quarter wave plate facing away from the first quarter wave plate, wherein a direction of an absorption axis of the second polarizing film is the same as the direction of the absorption axis of the first polarizing film.

8. The display system as claimed in claim 7, wherein an angle between the direction of the optical axis of the first quarter wave plate and the direction of the absorption axis of the first polarizing film is 45° or 135°.

9. The display system as claimed in claim 8, wherein the direction of the absorption axis of the first polarizing film is 0° or 90°, and the direction of the optical axis of the first quarter wave plate is 45° or 135°.

10. The display system as claimed in claim 7, wherein an angle between the direction of the optical axis of the first quarter wave plate and the direction of the absorption axis of the first polarizing film is 45° or 135°.

11. The display system as claimed in claim 10, wherein the direction of the absorption axis of the first polarizing film is 0° or 90°, and the direction of the optical axis of the first quarter wave plate is 45° or 135°.

* * * * *